United States Patent
Chadha et al.

[11] Patent Number: 6,032,146
[45] Date of Patent: Feb. 29, 2000

[54] DIMENSION REDUCTION FOR DATA MINING APPLICATION

[75] Inventors: Atul Chadha, Milpitas; Balakrishna Raghavendra Iyer, San Jose, both of Calif.; Hammou Messatfa, Paris, France; Jeonghee Yi, San Jose, Calif.

[73] Assignee: International Business Machines Corporation, Armonk, N.Y.

[21] Appl. No.: 09/021,038

[22] Filed: Feb. 9, 1998

Related U.S. Application Data

[60] Provisional application No. 60/062,565, Oct. 21, 1997.

[51] Int. Cl.[7] .................................................. G06F 17/30
[52] U.S. Cl. ........................................ 707/6; 707/3; 707/5
[58] Field of Search ................................. 707/2, 3, 4, 5, 707/6

[56] References Cited

U.S. PATENT DOCUMENTS

| | | | |
|---|---|---|---|
| 5,615,341 | 3/1997 | Agrawal et al. | 395/210 |
| 5,727,199 | 3/1998 | Chen et al. | 707/6 |
| 5,819,258 | 10/1998 | Vaithyanathan et al. | 707/2 |
| 5,832,182 | 11/1998 | Zhang et al. | 706/50 |
| 5,832,475 | 11/1998 | Agrawal et al. | 707/2 |
| 5,857,179 | 1/1999 | Vaithyanathan et al. | 707/2 |
| 5,875,285 | 2/1999 | Chang | 706/53 |
| 5,884,305 | 3/1999 | Kleinberg et al. | 707/6 |
| 5,890,150 | 3/1999 | Ushijima et al. | 707/3 |

OTHER PUBLICATIONS

R. Agrawal, et al., "Fast Discovery of Association Rules", Advances in Knowledge Discovery and Data Mining, Chapter 12, pp. 307–328, 1995.

R. Agrawal, et al., "An Interval Classifier for Database Mining Applications", VLDB, pp. 560–573, Aug. 23–27, 1992.

J.H. Friedman, et al., "A Projection Pursuit Algorithm for Exploratory Data Analysis", IEEE Transactions on Computers, vol. C–23, No. 9, pp. 881–890, Sep. 1974.

M.C. Jones, et al., "What is Projection Pursuit?", J. R. Statis. Soc., Series A, vol. 150, Part 1, pp. 1–38, 1987.

M. Houtsma, et al., "Set–Oriented Mining for Association Rules in Relational Databases", Proceedings of the Eleventh International Conference on Data Engineering, pp. 25–33, Mar. 6–10, 1995.

*Primary Examiner*—Jean R. Homere
*Attorney, Agent, or Firm*—Pretty, Schroeder & Poplawski, P.C.

[57] ABSTRACT

A method, apparatus, and article of manufacture for a computer-implemented random reliability engine for computer-implemented dimension reduction using association rules for data mining application. The data mining is performed by the computer to retrieve data from a data store stored on a data storage device coupled to the computer. The data store has records that have multiple attributes. The multiple attributes of a table are clustered to produce a plurality of sets of attributes. Each set of attributes is clustered to obtain data mining attributes.

33 Claims, 8 Drawing Sheets

DIMENSION REDUCTION FOR DATA MINING APPLICATION

PROVISIONAL APPLICATION

This application claims the benefit of U.S. Provisional Application No. 60/062,565, entitled "DIMENSION REDUCTION TECHNIQUES FOR DATA MINING APPLICATION," filed on Oct. 21, 1997, by Atul Chadha et al., which is incorporated by reference herein.

CROSS-REFERENCE TO RELATED APPLICATION

This application is related to the following copending and commonly-assigned patent application:

Application Ser. No. 09/020,438, entitled "DIMENSION REDUCTION USING ASSOCIATION RULES FOR DATA MINING APPLICATION," filed on same date herewith, by Atul Chadha et al., which is incorporated by reference herein.

BACKGROUND OF THE INVENTION

1. Field of the Invention

This invention relates in general to computer implemented data mining, and in particular to dimension reduction for data mining application.

2. Description of Related Art

Data mining is the process of finding interesting patterns in data. Data mining often involves datasets with a large number of attributes. Many of the attributes in most real world data are redundant and/or simply irrelevant to the purposes of discovering interesting patterns.

Dimension reduction selects relevant attributes in the dataset prior to performing data mining. This is important for the accuracy of further analysis as well as for performance. Because the redundant and irrelevant attributes could mislead the analysis, including all of the attributes in the data mining procedures not only increases the complexity of the analysis, but also degrades the accuracy of the result. For instance, clustering techniques, which partition entities into groups with a maximum level of homogeneity within a cluster, may produce inaccurate results. In particular, because the clusters might not be strong when the population is spread over the irrelevant dimensions, the clustering techniques may produce results with data in a higher dimensional space including irrelevant attributes. Dimension reduction improves the performance of data mining techniques by reducing dimensions so that data mining procedures process data with a reduced number of attributes. With dimension reduction, improvement in orders of magnitude is possible.

The conventional dimension reduction techniques are not easily applied to data mining applications directly (i.e., in a manner that enables automatic reduction) because they often require a priori domain knowledge and/or arcane analysis methodologies that are not well understood by end users. Typically, it is necessary to incur the expense of a domain expert with knowledge of the data in a database who determines which attributes are important for data mining. Moreover, conventional dimension reduction techniques are not designed for processing the large datasets that data mining processes.

Some statistical analysis techniques, such as correlation tests, have been applied for dimension reduction. However, these are ad hoc and assume a priori knowledge of the dataset which can not be assumed to always be available.

Some automatic procedures have been proposed for dimension reduction for exploratory analysis of multivariate datasets. The Principal Components Analysis technique reduces dimensions based on the proportion of total variance of each attribute. Attributes with higher proportion of total variance are selected as principal components. Projection pursuit, one technique of automatic selection, was proposed in J. H. Friedman and J. W. Tukey, *A Projection Pursuit Algorithm for Exploratory Data Analysis,* IEEE Transactions on Computers, 1974, Vol. 23, pp. 881–889, which is incorporated by reference herein. Projection pursuit reveals structure in the original data by offering selected low-dimensional orthogonal projections of the data for inspection. Projection pursuit makes automatic selections by the local optimization over projection directions of an index of interestingness.

However, these techniques are not practically applicable for data mining problems that deal with very large datasets, commonly with millions to billions of records and a large number of attributes. Instead, these techniques are mainly designed for small datasets of hundreds to thousands of records, typically having fewer than ten attributes.

Some recent work in data mining research was designed for the discovery of association rules for large datasets. A rule is a grouping of attribute value pairs. Houtsma and Swami developed a set-oriented association rule discovery technique SETM, which is described in M. Houtsma and A. Swami, *Set-Oriented Mining for Association Rules in Relational Databases,* Research Report RJ 9567, October 1993, IBM Almaden Research Center, [hereinafter "Houtsma and Swami"], which is incorporated by reference herein. Houtsma and Swami showed that association can be carried out by a general relational query language, such as SQL. The set-oriented nature of SETM simplifies the technique and facilitates extensions such as parallelization.

The Apriori and AprioriTid techniques are described in R. Agrawal, H. Mannila, R. Srikant, H. Toivonen, and Verkamo A. I., *Fast Discovery of Association Rules,* Advances in Knowledge Discovery and Data Mining, Chap. 12, AAAI/MIT Press, 1995, which is incorporated by reference herein. Apriori and AprioriTid offer improved performance by reducing the number of association rules generated in each pass with small support. Moreover, AprioriTid makes use of the rules generated in the previous pass instead of accessing the whole database again for the next pass.

There is a need in the art for improved dimension reduction for use in data mining with large datasets.

SUMMARY OF THE INVENTION

To overcome the limitations in the prior art described above, and to overcome other limitations that will become apparent upon reading and understanding the present specification, the present invention discloses a method, apparatus, and article of manufacture for computer-implemented dimension reduction using association rules for data mining application.

In accordance with the present invention, data mining is optimized in a computer. The data mining is performed by the computer to retrieve data from a data store stored on a data storage device coupled to the computer. The data store has records that have multiple attributes. The multiple attributes of a table are clustered to produce a plurality of sets of attributes. Each set of attributes is clustered to obtain data mining attributes.

One object of the present invention is to provide entirely computer-implemented dimension reduction for data mining without the need for a domain expert. Another object of the present invention is to determine important and relevant attributes for data mining.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
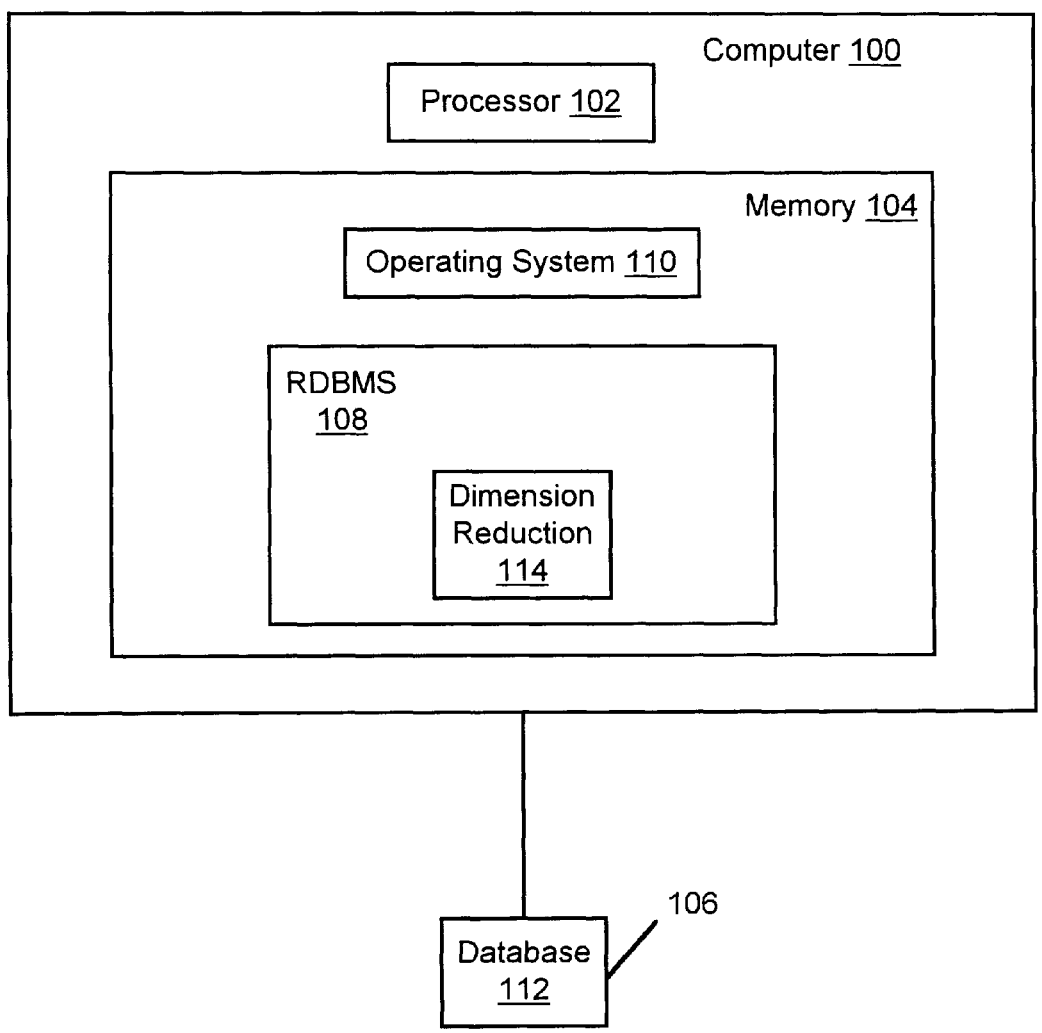
FIG. 1 is a block diagram illustrating an exemplary hardware environment, including software elements, used to implement the preferred embodiment of the invention.

FIG. 1 is a block diagram illustrating an exemplary hardware environment, including software elements, used to implement the preferred embodiment of the invention. In the exemplary hardware environment, a computer 100 is comprised of one or more processors 102, random access memory (RAM) 104, and assorted peripheral devices. The peripheral devices usually include one or more fixed and/or removable data storage devices 106, such as a hard disk, floppy disk, CD-ROM, tape, etc. Those skilled in the art will recognize that any combination of the above components, or any number of different components, peripherals, and other devices, may be used with the computer 100.

The present invention is typically implemented using relational database management system (RDBMS) software 108, such as the DB2® product sold by IBM Corporation, although it may be implemented with any database management system (DBMS) software. The RDBMS software 108 executes under the control of an operating system 110, such MVS®, AIX®, OS/2®, WINDOWS NT®, WINDOWS®, UNIX®, etc. Those skilled in the art will recognize that any combination of the above software, or any number of different software applications may be used to implement the present invention. Additionally, the present invention can be implemented with any data store rather than a relational database.

The RDBMS software 108 receives commands from users for performing various search and retrieval functions, termed queries, against one or more databases 112 stored in the data storage devices 106. In the preferred embodiment, these queries conform to the Structured Query Language (SQL) standard, although other types of queries could also be used without departing from the scope of the invention. The queries invoke functions performed by the RDBMS software 108, such as definition, access control, interpretation, compilation, database retrieval, and update of user and system data. Additionally, the RDBMS software 108 includes dimension reduction software 114 for optimizing data mining.

The RDBMS software 108, the SQL queries, and the instructions derived therefrom, may be tangibly embodied in or readable from a computer-readable medium, e.g. one or more of the data storage devices 106 and/or data communications devices coupled to the computer. Moreover, the RDBMS software 108, the SQL queries, and the instructions derived therefrom, are all comprised of instructions which, when read and executed by the computer 100, cause the computer 100 to perform the steps necessary to implement and/or use the present invention.

Dimension Reduction

A database 112 is a set of records that are described by a set of attributes which have values. Each record is a point in multi-dimensional space, each dimension corresponding to an attribute of the database 112. Association rules are derived from and used to represent frequently occurring patterns within the database 112. Clustering is a data mining technique used to order records into subsets, where records in each subset are very similar to each other in a predefined manner.

Data mining retrieves interesting data from a very large database 112, such as a database describing existing, past, or potential clients that may have thousands of attributes. Conventional data mining techniques do not work well on a database with a large number of attributes. Moreover, some of the attributes are not relevant to the retrieved information. For example, when analyzing buying patterns of consumers, an attribute providing the date on which customer information was first entered into the database may not be relevant. Dimension reduction is the process of removing the irrelevant attributes prior to performing data mining.

Figure 2:
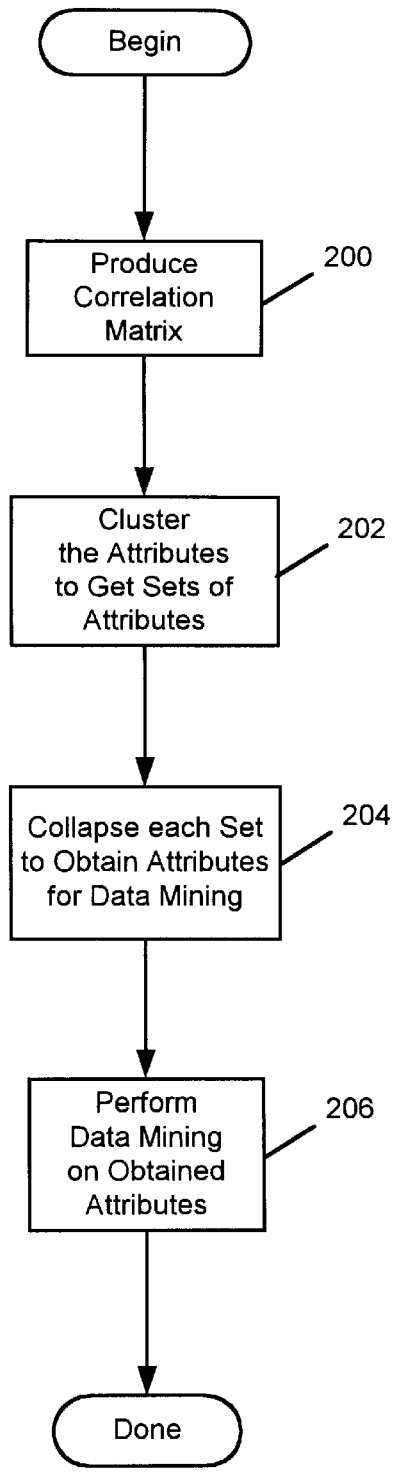
FIG. 2 is a flow diagram illustrating the steps that are performed for dimension reduction.

FIG. 2 is a flow diagram illustrating the steps that are performed for dimension reduction. Block 200 represents the dimension reduction software 114 producing a correlation matrix, consisting of correlations between each pair of attributes from an original table. The input data from the original table consists of "n" attributes, of which "p" are categorical attributes and "m" are continuous attributes. Categorical attributes take values from a domain of labels or names. For example, an attribute that describes the ethnicity of a consumer is a categorical attribute. Continuous attributes take values from a numerical domain. For example, an attribute that describes the average monthly balance of a consumer is a continuous attribute.

The dimension reduction software 114 constructs an "n" by "n" matrix COR consisting of correlation measures between each pair of attributes. The "p" attributes ($V_0 \ldots V_{p-1}$) are categorical and are arranged from columns "0" through "p−1" and rows "0" through "p−1". The "m" attributes ($W_p \ldots W_{n-1}$) are continuous attributes and are arranged from columns "p" through "n−1" and rows "p" through "n−1".

$$COR = \begin{array}{c} v \\ w \end{array}\begin{bmatrix} a_{ij} & b_{ij} \\ c_{ij} & d_{ij} \end{bmatrix}$$

One correlation matrix is shown above, however the "p" categorical attributes and the "m" continuous attributes may be related by different correlations, which produce different correlation matrices. The values $a_{ij}$ in the correlation matrix shown above are association measures between the "p" categorical attributes $V_i$ and $V_j$. For example, a person skilled in the art of association rules used for data mining will appreciate that the association measures can be Chi-square, entropy, etc. The values $b_{ij}$ are a correlation measure between the "p" categorical attributes and the "m" continuous attributes $V_i$ and $W_j$. The values $c_{ij}$ are a correlation measure between the continuous and the categorical attributes $W_i$ and $V_j$. The values $d_{ij}$ are association measures between the "m" continuous attributes $W_i$ and $W_j$. The values $a_{ij}$, $b_{ij}$, $c_{ij}$, and $d_{ij}$ are then normalized to be between "0" and "1".

Block 202 represents the dimension reduction software 114 clustering the attributes in the original table to get sets of attributes (i.e., smaller tables). The "n" rows of the matrix produced are clustered. The number of clusters can be fixed (e.g., "d" clusters) based on how many dimensions are required after the dimension reduction is performed. By clustering the rows, all attributes that have similar correlations with other attributes are grouped into one set of attributes. This forms "d" non-intersecting sets of attributes, each consisting of some subset of all the attributes from the original table.

Block 204 represents the dimension reduction software 114 collapsing each set of attributes into one or two attributes to be used for data mining. The "d" sets of attributes are collapsed to "d" (or a small multiple of "d") attributes (i.e., dimensions). The collapsing can be performed by at least three techniques, and these techniques are discussed in further detail below with reference to FIGS. 3–8.

Block 206 represents the RDBMS software 108 performing the data mining using the obtained attributes (i.e., reduced dimensions).

Figure 3:
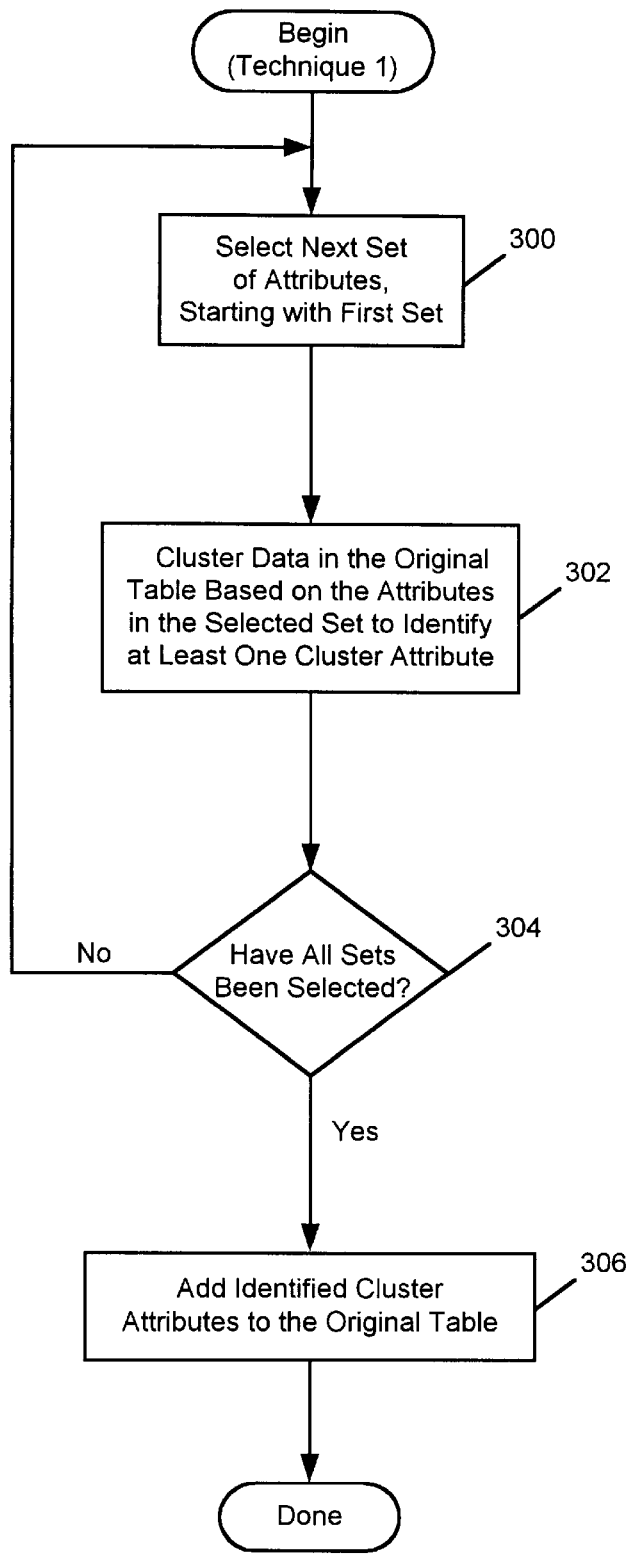
FIG. 3 is a flow diagram illustrating the steps the dimension reduction software performs to collapse "d" sets of attributes into "d" attributes under Technique 1.

FIG. 3 is a flow diagram illustrating the steps the dimension reduction software 114 performs to collapse the "d" sets of attributes into approximately "d" attributes under Technique 1. For each set of attributes (i.e., from the "d" sets), the dimension reduction software 114, under Technique 1, clusters the original data using the attributes in the set to identify one or more cluster attributes for that set. When the dimension reduction software 114 has completed this process, one or more cluster attributes have been selected from each of the "d" sets of attributes. These cluster attributes are added to the original table as new attributes. One skilled in the art would recognize that any one of many different clustering techniques may be used to identify the cluster attribute. The cluster attribute may be a combination of the attributes in the active attributes set. For example, if the attributes in the active attributes set included a customer identifier and a transaction identifier, a cluster attribute could be a concatenation of the two identifiers. The dimension reduction software 114 adds the cluster attributes to the original table. The data mining of step 206 in FIG. 2 is performed using the cluster attributes, thereby reducing the "n" dimensions of the original table to approximately "d" dimensions for data mining.

Block 300 represents the dimension reduction software 114 selecting the next set of attributes from among the "d" sets, starting with the first set of attributes. Block 302 represents the dimension reduction software 114 clustering data in the original table based on the attributes in the selected set of attributes to identify at least one cluster attribute from that set. A cluster attribute may be identified using any one of the many different clustering techniques that are available. Block 304 represents the dimension reduction software 114 determining whether all sets of attributes have been selected. When all of the sets of attributes have not been selected, the dimension reduction software 114 loops back to Block 300 to process the next set of attributes. When all of the sets of attributes have been selected, in Block 306, the dimension reduction software 114 adds the identified cluster attributes to the original table for use in data mining.

Figure 4:
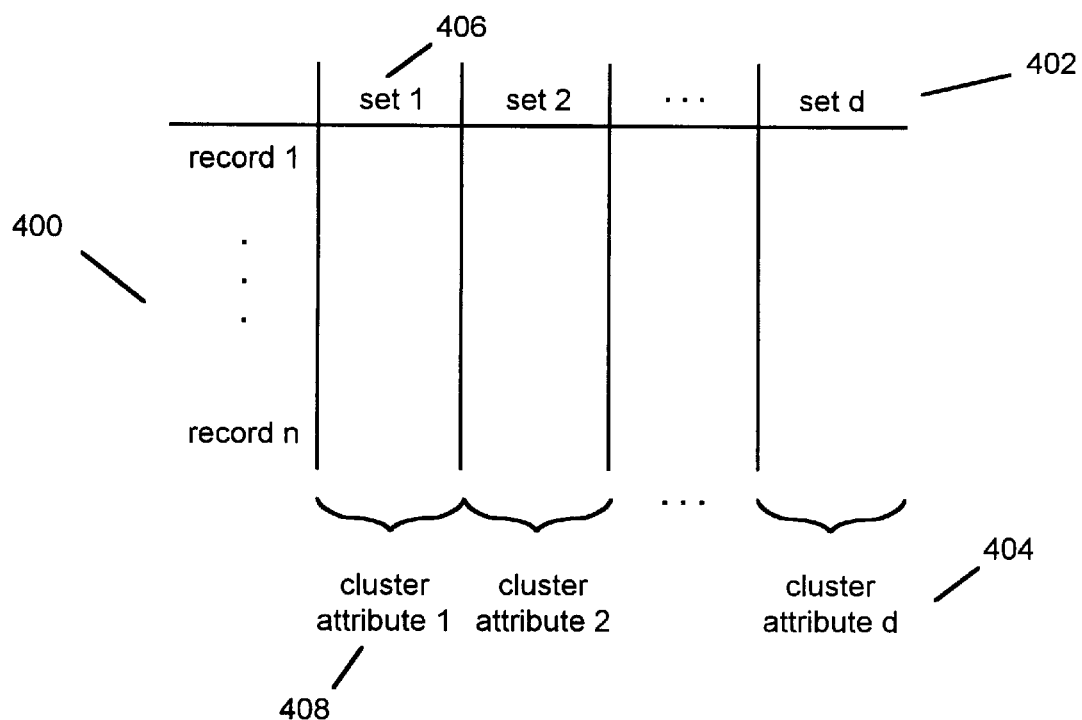
FIG. 4 is a table illustrating the outcome of the dimension reduction software performing Technique 1.

FIG. 4 is a table illustrating the outcome of the dimension reduction software 114 performing Technique 1. For each set of attributes 402, set "1" to set "d", of "n" records 400, record "1" to record "n", at least one cluster attribute 404 is identified. For example, for set "1" 406, cluster attribute "1" 408 is identified. The cluster attributes "1" to "d" are new attributes that are added to the original table and used for data mining.

Figure 5:
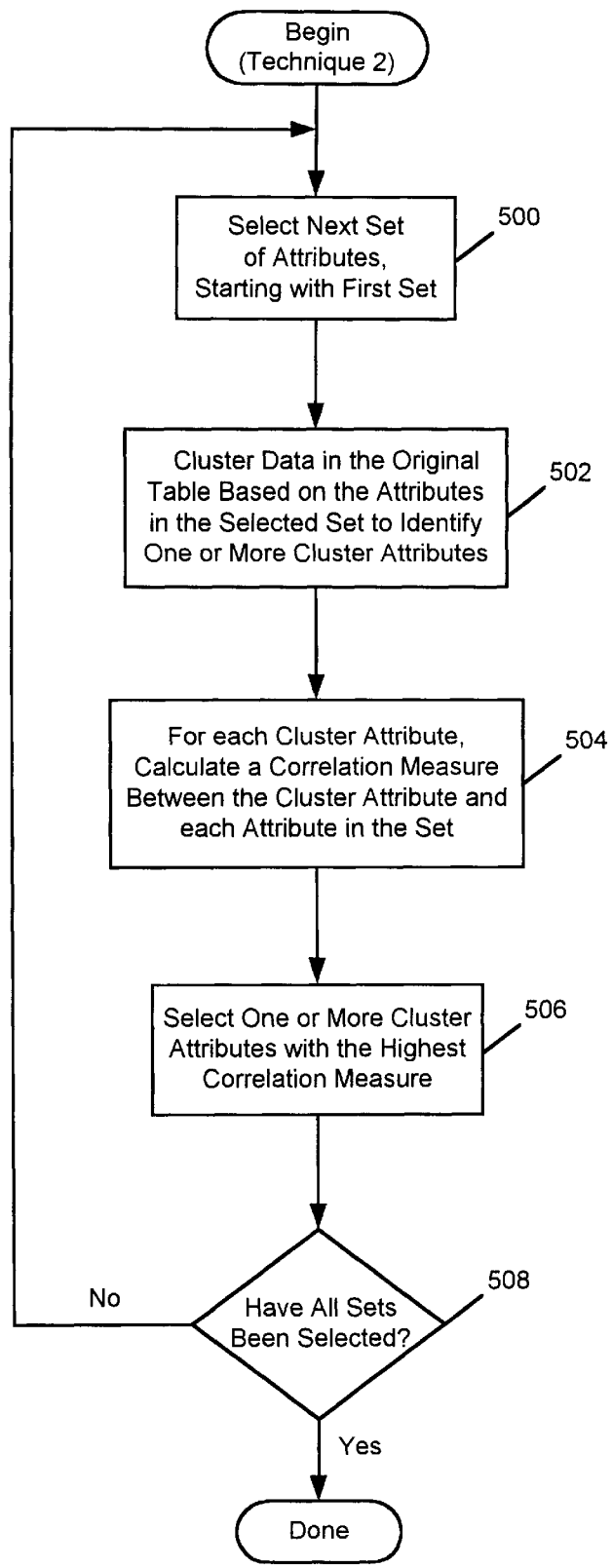
FIG. 5 is a flow diagram illustrating the steps the dimension reduction software performs to collapse the "d" sets of attributes into "d" attributes under Technique 2.

FIG. 5 is a flow diagram illustrating the steps the dimension reduction software 114 performs to collapse the "d" sets of attributes into approximately "d" attributes under Technique 2. Block 500 represents the dimension reduction software 114 selecting the next set of attributes from among the "d" sets, starting with the first set. Block 502 represents the dimension reduction software 114 clustering data in the original data based on the attributes in the selected set to identify one or more cluster attributes. In Block 504, for each identified cluster attribute, the dimension reduction software 114 calculates a correlation measure between the cluster attribute and each attribute in the set. Block 506 represents the dimension reduction software 114 selecting one or more cluster attributes from each set having the highest correlation measure. These selected cluster attributes are used for data mining, and unlike Technique 1, under Technique 2, the resulting set of cluster attributes are not added to the original table as new attributes.

Block 508 represents the dimension reduction software 114 determining whether all sets of attributes have been selected. When all of the sets of attributes have not been selected, the dimension reduction software 114 loops back to Block 500 to process the next set of attributes. When all of the sets of attributes have been selected, the dimension reduction software 114 is done performing Technique 2.

Figure 6:
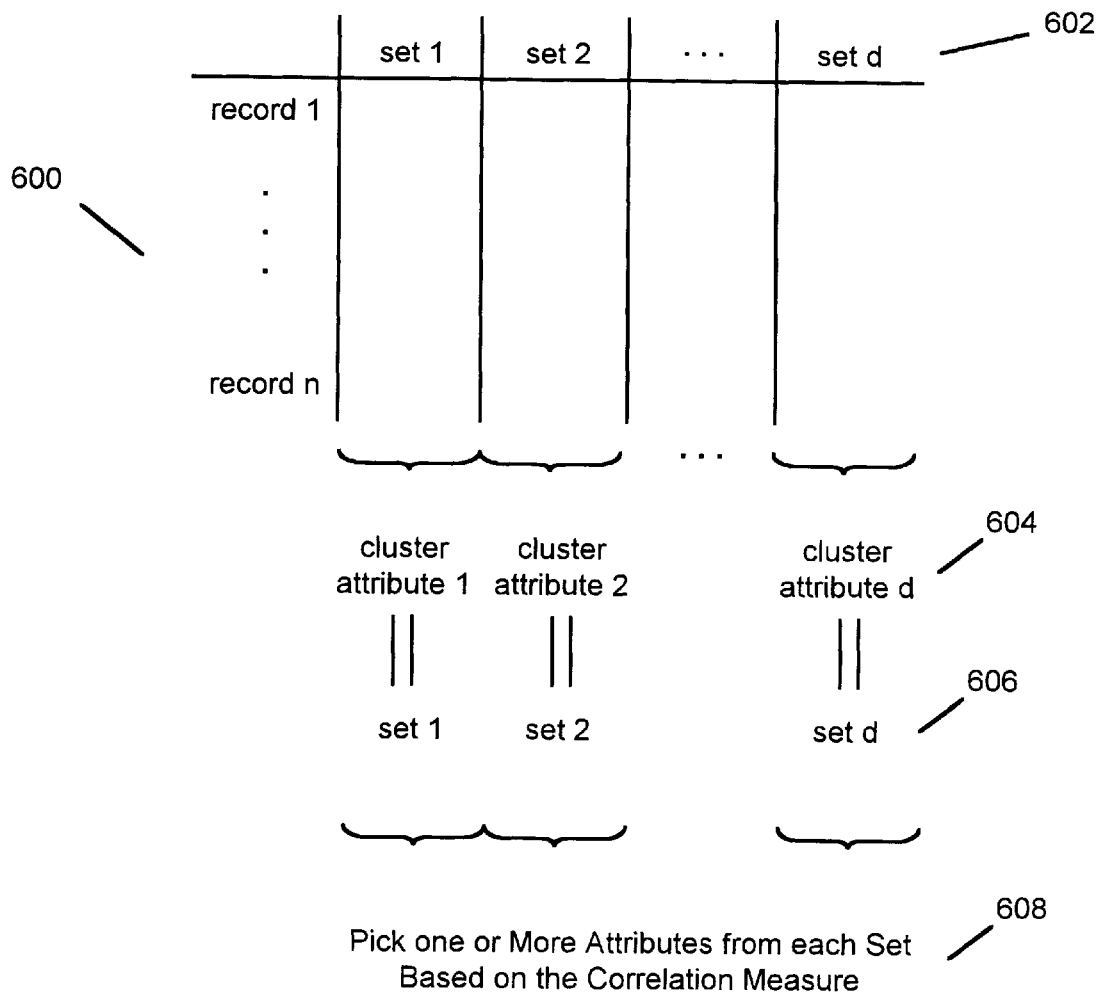
FIG. 6 is a table illustrating the outcome of the dimension reduction software performing Technique 2.

FIG. 6 is a table illustrating the outcome of the dimension reduction software 114 performing Technique 2. First, one or more cluster attributes are identified for each of the "d" sets of attributes 604. Then, correlation measures are calculated between the cluster attributes 604 and the corresponding sets of attributes 606. From each set of attributes, one or more cluster attributes 608 are selected based on the correlation measure for use in data mining. The cluster attributes with the highest correlation measure are selected.

Figure 7:
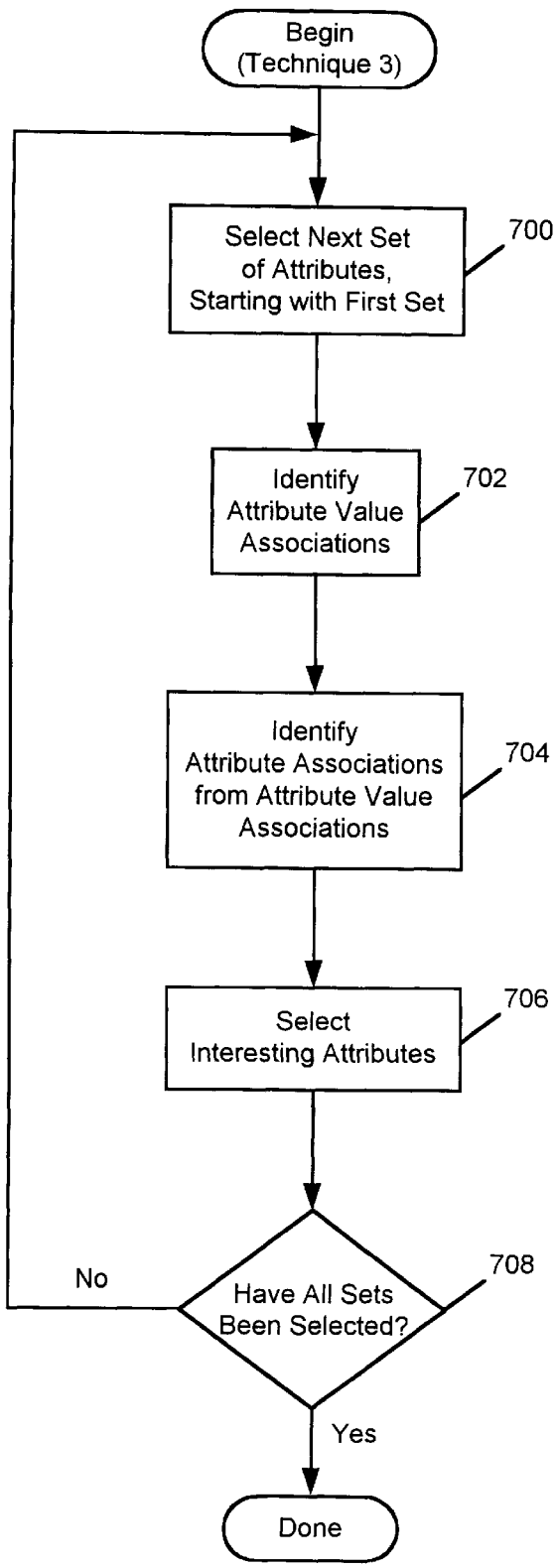
FIG. 7 is a flow diagram illustrating the steps the dimension reduction software performs to collapse the "d" sets of attributes into "d" attributes under Technique 3.

FIG. 7 is a flow diagram illustrating the steps the dimension reduction software 114 performs to collapse the "d" sets of attributes into "d" attributes under Technique 3. Under Technique 3, association rules are used to distinguish interesting attributes from irrelevant attributes. The dimension reduction software 114 measures the importance of each attribute based on association rules and their support. Support of a rule is a measure of frequency of the rule, which is defined as the ratio of transactions supporting the rule to the total number of transactions in the database 112, where a transaction is a collection of attribute-value pairs. For example, for attribute value pairs attribute2-value2 and attribute5-value5, if these attribute value pairs occurred five percent of the time in the database, then support of the rule is said to be five percent.

The conventional association techniques, such as SETM, Apriori and AprioriTid, discover attribute value associations, not attribute associations. In other words, the association rules found by these conventional techniques are patterns of attribute values, rather than patterns of attributes. Unlike Techniques 1 and 2 discussed above, the dimension reduction software 114 of Technique 3 obtains attribute associations to select interesting attributes. The selection and use of interesting attributes reduces the dimension of attributes (not attribute values). The dimension reduction software 114 of Technique 3 automatically obtains attribute associations from the attribute value associations.

Block 700 represents the dimension reduction software 114 selecting a next set of attributes, starting with the first set of attributes. Block 702 represents the dimension reduction software 114 identifying attribute value associations. Attribute value associations are identified using conventional techniques. Initially, the value of an attribute is associated with the attribute. After this, each row has "n" attribute value pairs. Next, the dimension reduction software 114 determines the number of times different attribute value pairs occur. When the same attribute value pairs often occur together in the same row of the database 112 for many records, those attribute value pairs are associated. For example, if many different rows in the database had the attribute value pairs of attribute credit-rating with a value of excellent and attribute state with a value of California, these attribute value pairs would be associated with each other.

Block 704 represents the dimension reduction software 114 identifying attribute associations from the attribute value associations. Once attribute value associations are identified, the dimension reduction software 114 determines the strength of the associations based on how often those associations occur together in rows of the database 112. Then, the attributes having the strong associations are selected for data mining. That is, to obtain attribute associations from the attribute value associations, the dimension reduction software 114 integrates attribute value associations over the value of the attributes. Only attribute value association rules with high support are included to produce attribute associations by integrating support of the rules for each attribute in the descending order of support. The cumulative support of each attribute is a measure of the importance of each attribute.

Block 706 represents the dimension reduction software 114 selecting at least one interesting attribute. In particular, the dimension reduction software 114 takes the attribute value association rule with the highest support and adds support of the rule to each attribute associated in the rule. The dimension reduction software 114 continues the summation until the dimension reduction software 114 reaches a cut-off point. The cut-off point can be preset to the number of dimensions desired for each set of attributes for data mining. Then, the attributes with positive cumulative support count are selected as interesting attributes. Next, the attribute association that contains the interesting attributes is selected.

Block 708 represents the dimension reduction software 114 determining whether all sets of attributes have been selected. When all of the sets of attributes have been selected, the selected attributes are used for data mining. When all of the sets of attributes have not been selected, the dimension reduction software 114 loops back to Block 700 to process the next set of attributes.

Figure 8:
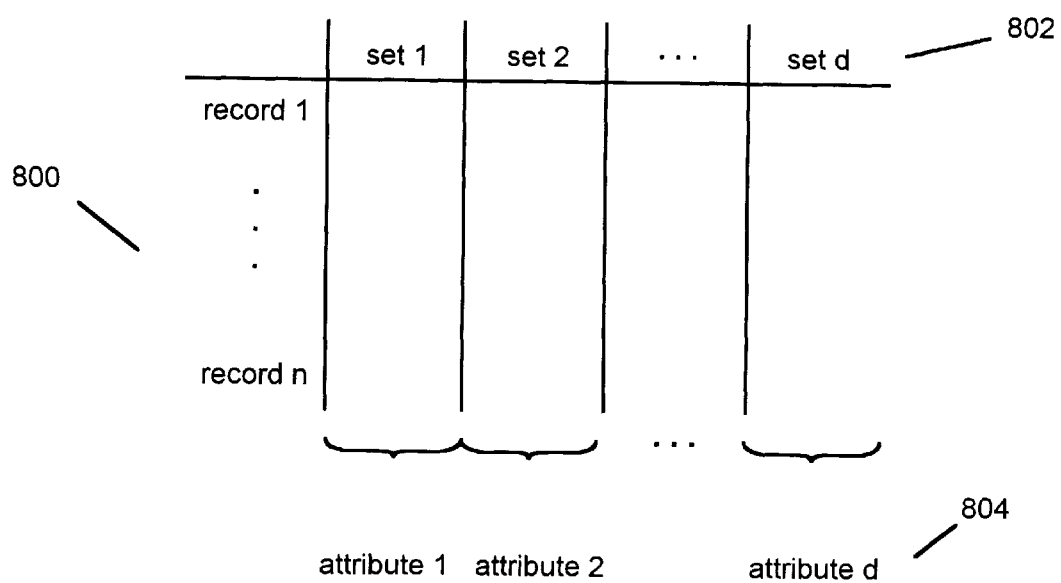
FIG. 8 is a table illustrating the outcome of the dimension reduction software performing Technique 3.

FIG. 8 is a table illustrating the outcome of the dimension reduction software 114 performing Technique 3. For each of the "d" sets of attributes 802 determined in Block 202, the dimension reduction software 114 uses association rules to distinguish interesting attributes from irrelevant attributes. In particular, for the "d" sets of attributes 802, the dimension reduction software 114 selects "d" attributes 804 for use in data mining.

In one embodiment of the present invention, binary association rules are used to calculate the importance measure of each attribute. The cut-off point is set to be the top 0.1% of the total number of binary rules. The total number of binary rules is "n" by "m" by "m−1", where "n" is the number of records in the database 112, and "m" is the number of attributes in the database 112. In this embodiment, dimension reduction is implemented in set-oriented fashion and includes the attribute value association adopted from Houtsma and Swami.

The following is pseudocode for the dimension reduction software 114:

```
Value_Association = association_rules(database):
for(each attribute, i, in the database)
    begin
        cum_support[i] = 0;
    end;
while (true)
    begin
        NextRule = next_rule(Value_Association);
        for(each attribute, i, in NextRule)
        begin
            cum_support[i] += support of the rule;
        end;
    tot_support=0;
    for(each attribute, i, in the database)
        begin
            tot_support += cum_support[i];
        end;
    if(tot_support > cut_off)
        begin
            Att_Association = {i|cum_support[i] > 0};
            return(Att_Association);
        end;
end;/*while*/
```

The association_rules function finds all of the attribute value association rules from a given database 112. The next_rule function returns an association rule with the next highest support and removes the association rule from the pool of attribute value association rules.

In another embodiment, the present invention is combined with clustering. Details about clustering are described in A. K. Jain, and R. C. Dubes, *Algorithms for Clustering Data,* Prentice Hall, Englewood Cliffs, N.J. 07632, 1988, which is incorporated by reference herein.

For the embodiment in which dimension reduction is combined with clustering, benchmark data for classification, described in R. Agrawal, S. Ghosh, T. Imielinski, B. Iyer, and A. Swami, *An Interval Classifier for Database Mining Applications,* Proceedings of the 18th VLBD Conference, Vancouver, Canada, 1992, pp. 560–573, which is incorporated by reference herein, was modified slightly for clustering purposes, because the benchmark data was not appropriate for testing clustering. Then, the dimension reduction technique described above was applied to the synthetic dataset before clustering, which successfully eliminated irrelevant dimensions and detected two principal dimensions that contributed to the formation of clusters.

The combination of dimension reduction with a clustering technique demonstrates successful dimension reduction, which was found to improve the quality of clustering as well as performance in the clustering phase since clustering is done in the significantly reduced number of dimensions.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for dimension reduction based on associations for large data mining applications. The dimension reduction is applied to general data mining applications without the help of domain experts because it does not require domain knowledge often held only by experts who know the data domain very well. Moreover, the dimension reduction of the present invention is very simple and can be applied to large datasets with low complexity with an efficient association technique.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method of optimizing data mining in a computer, the data mining being performed by the computer to retrieve data from a data store stored on a data storage device coupled to the computer, the data store having records that have multiple attributes, the method comprising the steps of:
   clustering the multiple attributes of a table to produce a plurality of non-intersecting sets of attributes, wherein each attribute has one or more attribute values; and
   collapsing each of said non-intersecting set of attributes to select one or more attributes from each of said non-intersecting set, without selecting all of the attributes of the table, wherein the selected attributes are to be used to perform data mining.

2. The method of claim 1 above, wherein the step of collapsing, further comprises the steps of:
   for each set of attributes, clustering the data in the table based on the attributes in the set to identify at least one cluster attribute; and
   adding each identified cluster attribute to the table.

3. The method of claim 2 above, further comprising performing data mining on the table using the added cluster attributes.

4. The method of claim 1 above, wherein the step of collapsing, further comprises the steps of:
   for each set of attributes, clustering the data in the table based on the attributes in the set to identify one or more cluster attributes;
   for each cluster attribute, calculating a correlation measure between the cluster attribute and each attribute in the set; and
   selecting one or more cluster attributes with the highest correlation measures.

5. A method of optimizing data mining in a computer, the data mining being performed by the computer to retrieve data from a data store stored on a data storage device coupled to the computer, the data store having records that have multiple attributes, the method comprising the steps of:
   clustering the multiple attributes of a table to produce a plurality of sets of attributes; and
   collapsing each set of attributes to obtain data mining attributes, wherein the step of collapsing further comprises the steps of:
      for each set of attributes, clustering the data in the table based on the attributes in the set to identify one or more cluster attributes;
      for each cluster attribute, calculating a correlation measure between the cluster attribute and each attribute in the set;
      selecting one or more cluster attributes with the highest correlation measures; and
      performing data mining on the table using the selected cluster attributes.

6. The method of claim 1 above, wherein the step of collapsing, further comprises the steps of:
   determining attribute value associations between attributes and their values;
   determining attribute associations from the determined attribute value associations; and
   selecting attributes based on the determined attribute associations for performing data mining.

7. A method of optimizing data mining in a computer, the data mining being performed by the computer to retrieve data from a data store stored on a data storage device coupled to the computer, the data store having records that have multiple attributes, the method comprising the steps of:
   clustering the multiple attributes of a table to produce a plurality of sets of attributes; and
   collapsing each set of attributes to obtain data mining attributes, wherein the step of collapsing further comprises the steps of:
      determining attribute value associations between attributes and their values;
      determining attribute associations from the determined attribute value associations, wherein the step of determining attribute associations further comprises the step of integrating attribute value associations over a value of multiple attributes; and
      selecting attributes based on the determined attribute associations for performing data mining.

8. The method of claim 7 above, wherein the step of integrating further comprises the step of integrating attribute value associations that have high support.

9. A method of optimizing data mining in a computer, the data mining being performed by the computer to retrieve data from a data store stored on a data storage device coupled to the computer, the data store having records that have multiple attributes, the method comprising the steps of:
   clustering the multiple attributes of a table to produce a plurality of sets of attributes; and
   collapsing each set of attributes to obtain data mining attributes, wherein the step of collapsing further comprises the steps of:
      determining attribute value associations between attributes and their values;
      determining attribute associations from the determined attribute value associations; and
      selecting attributes based on the determined attribute associations for performing data mining until a cut-off point is reached.

10. A method of optimizing data mining in a computer, the data mining being performed by the computer to retrieve data from a data store stored on a data storage device coupled to the computer, the data store having records that have multiple attributes, the method comprising the steps of:

clustering the multiple attributes of a table to produce a plurality of sets of attributes; and collapsing each set of attributes to obtain data mining attributes, wherein the step of collapsing, further comprises the steps of:

determining attribute value associations between attributes and their values;

determining attribute associations from the determined attribute value associations;

selecting attributes based on the determined attribute associations for performing data mining; and clustering data from the data store using the selected attributes.

11. The method of claim 1 above, wherein prior to the step of clustering, further comprising the step of producing a correlation matrix.

12. An apparatus for optimizing data mining, comprising:

a computer having a memory and a data storage device coupled thereto, wherein the data storage device stores a data store, the data store having records that have multiple attributes;

one or more computer programs, performed by the computer, for clustering the multiple attributes of a table to produce a plurality of non-intersecting sets of attributes, wherein each attribute has one or more attribute values, and collapsing each of said non-intersecting set of attributes to select one or more attributes from each of said non-intersecting set, without selecting all of the attributes of the table, wherein the selected attributes are to be used to perform data mining.

13. The apparatus of claim 12 above, wherein the means for collapsing, further comprises:

means for clustering for each set of attributes the data in the table based on the attributes in the set to identify at least one cluster attribute; and means for adding each identified cluster attribute to the table.

14. The apparatus of claim 13 above, further comprising means for performing data mining on the table using the added cluster attributes.

15. The apparatus of claim 12 above, wherein the means for collapsing, further comprises:

means for clustering for each set of attributes the data in the table based on the attributes in the set to identify one or more cluster attributes;

means for calculating for each cluster attribute a correlation measure between the cluster attribute and each attribute in the set; and means for selecting one or more cluster attributes with the highest correlation measures.

16. An apparatus for optimizing data mining, comprising:

a computer having a memory and a data storage device coupled thereto, wherein the data storage device stores a data store, the data store having records that have multiple attributes;

one or more computer programs, performed by the computer, for clustering the multiple attributes of a table to produce a plurality of sets of attributes and collapsing each set of attributes to obtain data mining attributes, wherein collapsing further comprises one or more computer programs, performed by the computer, for clustering for each set of attributes the data in the table based on the attributes in the set to identify one or more cluster attributes, calculating for each cluster attribute a correlation measure between the cluster attribute and each attribute in the set, selecting one or more cluster attributes with the highest correlation measures; and performing data mining on the table using the selected cluster attributes.

17. The apparatus of claim 12 above, further comprising:

means for determining attribute value associations between attributes and their values;

means for determining attribute associations from the determined attribute value associations; and means for selecting attributes based on the determined attribute associations for performing data mining.

18. An apparatus for optimizing data mining, comprising:

a computer having a memory and a data storage device coupled thereto, wherein the data storage device stores a data store, the data store having records that have multiple attributes;

one or more computer programs, performed by the computer, for clustering the multiple attributes of a table to produce a plurality of sets of attributes and collapsing each set of attributes to obtain data mining attributes, wherein collapsing further comprises one or more computer programs, performed by the computer, for determining attribute value associations between attributes and their values determining attribute associations from the determined attribute value associations which further comprises integrating attribute value associations over a value of multiple attributes, and selecting attributes based on the determined attribute associations for performing data mining.

19. The apparatus of claim 18 above, wherein the means for integrating further comprises the means for integrating attribute value associations that have high support.

20. An apparatus for optimizing data mining, comprising:

a computer having a memory and a data storage device coupled thereto, wherein the data storage device stores a data store, the data store having records that have multiple attributes;

one or more computer programs, performed by the computer, for clustering the multiple attributes of a table to produce a plurality of sets of attributes and collapsing each set of attributes to obtain data mining attributes, wherein collapsing further comprises one or more computer programs, performed by the computer, for determining attribute value associations between attributes and their values, determining attribute associations from the determined attribute value associations, and selecting attributes based on the determined attribute associations for performing data mining until a cut-off point is reached.

21. An apparatus for optimizing data mining, comprising:

a computer having a memory and a data storage device coupled thereto, wherein the data storage device stores a data store, the data store having records that have multiple attributes;

one or more computer programs, performed by the computer, for clustering the multiple attributes of a table to produce a plurality of sets of attributes and collapsing each set of attributes to obtain data mining attributes, wherein collapsing further comprises one or more computer programs, performed by the computer, for determining attribute value associations between attributes and their values, determining attribute associations from the determined attribute value associations, selecting attributes based on the determined attribute associations for performing data mining, and clustering data from the data store using the selected attributes.

22. The apparatus of claim 12 above, further comprising means for producing a correlation matrix.

23. An article of manufacture comprising a program storage medium readable by a computer and embodying one or more instructions executable by the computer to perform method steps for optimizing data mining, the data mining being performed by the computer to retrieve data from a data store stored on a data storage device coupled to the computer, the data store having records that have multiple attributes, the method comprising the steps of:

clustering the multiple attributes of a table to produce a plurality of non-intersecting sets of attributes, wherein each attribute has one or more attribute values; and collapsing each of said non-intersecting set of attributes to select one or more attributes from each of said non-intersecting set, without selecting all of the attributes of the table, wherein the selected attributes are to be used to perform data mining.

24. The article of manufacture of claim 23 above, wherein the step of collapsing, further comprises the steps of:

for each set of attributes, clustering the data in the table based on the attributes in the set to identify at least one cluster attribute; and adding each identified cluster attribute to the table.

25. The article of manufacture of claim 24 above, further comprising performing data mining on the table using the added cluster attributes.

26. The article of manufacture of claim 23 above, wherein the step of collapsing, further comprises the steps of:

for each set of attributes, clustering the data in the table based on the attributes in the set to identify one or more cluster attributes;

for each cluster attribute, calculating a correlation measure between the cluster attribute and each attribute in the set; and selecting one or more cluster attributes with the highest correlation measures.

27. An article of manufacture comprising a program storage medium readable by a computer and embodying one or more instructions executable by the computer to perform method steps for optimizing data mining, the data mining being performed by the computer to retrieve data from a data store stored on a data storage device coupled to the computer, the data store having records that have multiple attributes, the method comprising the steps of:

clustering the multiple attributes of a table to produce a plurality of sets of attributes; and collapsing each set of attributes to obtain data mining attributes, wherein the step of collapsing, further comprises the steps of:

for each set of attributes, clustering the data in the table based on the attributes in the set to identify one or more cluster attributes;

for each cluster attribute, calculating a correlation measure between the cluster attribute and each attribute in the set;

selecting one or more cluster attributes with the highest correlation measures; and performing data mining on the table using the selected cluster attributes.

28. The article of manufacture of claim 23 above, wherein the step of clustering further comprises the steps of:

determining attribute value associations between attributes and their values;

determining attribute associations from the determined attribute value associations; and selecting attributes based on the determined attribute associations for performing data mining.

29. An article of manufacture comprising a program storage medium readable by a computer and embodying one or more instructions executable by the computer to perform method steps for optimizing data mining, the data mining being performed by the computer to retrieve data from a data store stored on a data storage device coupled to the computer, the data store having records that have multiple attributes, the method comprising the steps of:

clustering the multiple attributes of a table to produce a plurality of sets of attributes; and collapsing each set of attributes to obtain data mining attributes, wherein the step of clustering further comprises the steps of:

determining attribute value associations between attributes and their values;

determining attribute associations from the determined attribute value associations, wherein the step of determining attribute associations further comprises the step of integrating attribute value associations over a value of multiple attributes; and selecting attributes based on the determined attribute associations for performing data mining.

30. The article of manufacture of claim 29 above, wherein the step of integrating further comprises the step of integrating attribute value associations that have high support.

31. An article of manufacture comprising a program storage medium readable by a computer and embodying one or more instructions executable by the computer to perform method steps for optimizing data mining, the data mining being performed by the computer to retrieve data from a data store stored on a data storage device coupled to the computer, the data store having records that have multiple attributes, the method comprising the steps of:

clustering the multiple attributes of a table to produce a plurality of sets of attributes; and collapsing each set of attributes to obtain data mining attributes, wherein the step of clustering further comprises the steps of:

determining attribute value associations between attributes and their values;

determining attribute associations from the determined attribute value associations; and selecting attributes based on the determined attribute associations for performing data mining until a cut-off point is reached.

32. An article of manufacture comprising a program storage medium readable by a computer and embodying one or more instructions executable by the computer to perform method steps for optimizing data mining, the data mining being performed by the computer to retrieve data from a data store stored on a data storage device coupled to the computer, the data store having records that have multiple attributes, the method comprising the steps of:

clustering the multiple attributes of a table to produce a plurality of sets of attributes; and collapsing each set of attributes to obtain data mining attributes, wherein the step of clustering further comprises the steps of:

determining attribute value associations between attributes and their values;

determining attribute associations from the determined attribute value associations;

selecting attributes based on the determined attribute associations for performing data mining; and clustering data from the data store using the selected attributes.

33. The article of manufacture of claim 23 above, wherein prior to the step of clustering, further comprising the step of producing a correlation matrix.

* * * * *